Dec. 12, 1939.   P. B. DRANE   2,183,448

RELIEF VALVE FOR TANKS

Filed Dec. 18, 1937

Inventor
Phillips B. Drane
By Philip A. H. Ferrell
Attorney

Patented Dec. 12, 1939

2,183,448

UNITED STATES PATENT OFFICE 2,183,448

RELIEF VALVE FOR TANKS

Phillips Brooks Drane, Tulsa, Okla.

Application December 18, 1937, Serial No. 180,643

14 Claims. (Cl. 220—44)

The invention relates to relief valves for use in connection with oil storage tanks, and has for its object to provide a device of this character wherein the hinged hood yieldably carries the pressure plate and the vacuum valve whereby the parts will move together upon movement of the hood to open position or to closed latched position.

A further object is to provide the pressure plate with a chambered member, axially disposed, and which chambered member extends into a chamber of the hood and is provided with lugs adapted to be passed through channels of a shouldered portion within the chamber of the hood and to be partially rotated for connecting the pressure plate and the hood when the floating connection or hinged connection of the pressure plate is made.

A further object is to provide the pressure plate with a lug, which, upon rotation of the pressure plate, will clear the hinged lugs of the hood and tank ring so the U-shaped guide member of the pressure plate may be attached to the plate lug for preventing rotation of the pressure plate after the connection is made.

A further object is to provide the pressure plate and the hood with chambered members, one extending into the other and a limited floating connection between the hood and plate, and to dispose all of the springs within the chambered member carried by the pressure plate, whereby they will have an axial movement insuring a positive operation of the parts during a vacuum pulling or pressure relieving operation. Also to provide the U-shaped anchoring member with vertically elongated recesses through which the hinge bolt extends, thereby allowing the pressure plate to unseat and move upwardly in a horizontal plane.

A further object is to terminate the lower ends of the lugs carried by the periphery of the cylindrical member carried by the pressure plate spaced from the shoulder within the cylindrical member of the hood when the hood is closed, thereby insuring a constant pressure on the gasket at all times, for instance when the gasket wears from use.

With the above and other objects in view, the invention resides in the combination and arrangement of parts as hereinafter set forth, shown in the drawing, described and claimed, it being understood that changes in the precise embodiment of the invention may be made within the scope of what is claimed without departing from the spirit of the invention.

Figure 1:
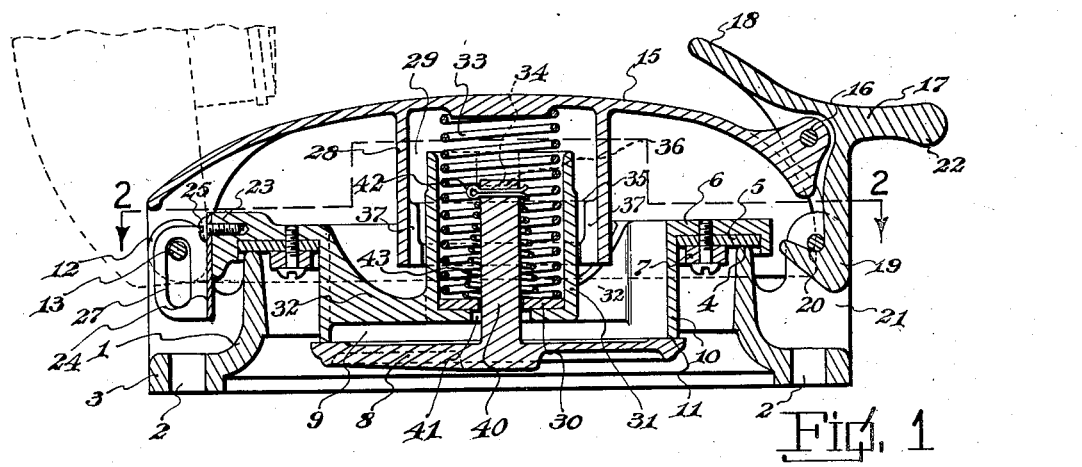
Figure 1 is a vertical longitudinal sectional view through the relief valve.
Figure 3:
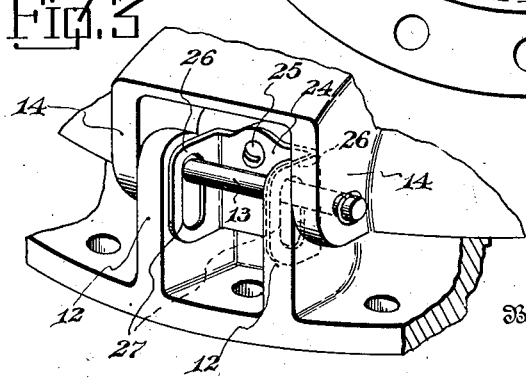
Figure 3 is a detail perspective view of the hinge connection of the hood to the tank ring and also of the pressure plate.
Figure 2:
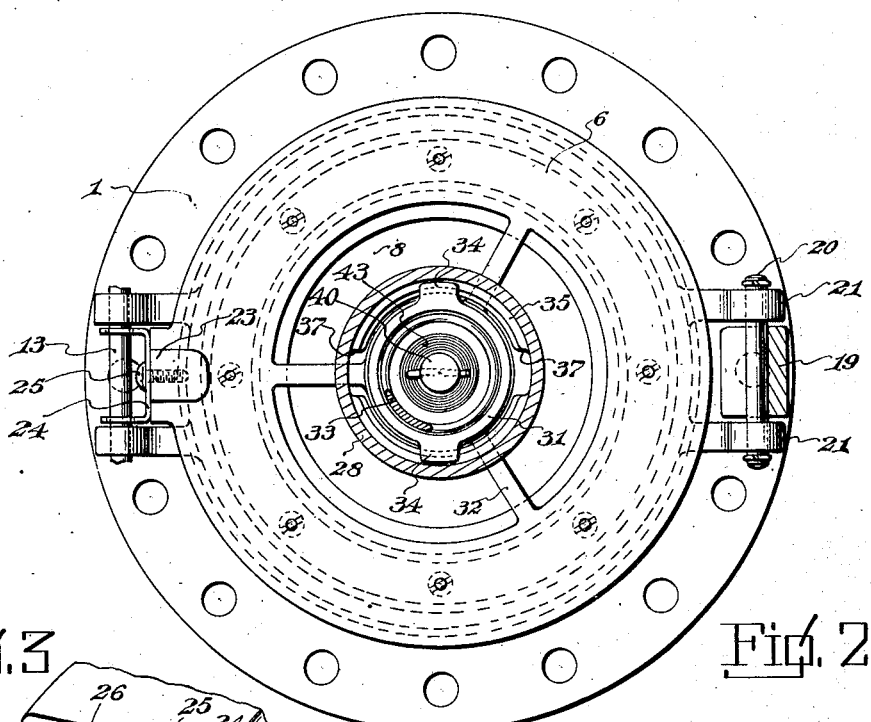
Figure 2 is a horizontal sectional view through the relief valve, taken on line 2—2 of Figure 1, showing in section the downwardly extending cylindrical portion of the hood.

To prevent damage to storage tanks, in which oil is stored, it is necessary to provide relief valve means in connection therewith whereby gases generated within the storage tank, and which build up pressure therein, may be exhausted to the atmosphere to prevent bursting of the tank. On the other hand it is also necessary to provide vacuum relief means whereby vacuum within the tank may be relieved by opening the relief valve and allowing an in rush of air from the atmosphere, otherwise the walls of the tank will be damaged, collapsed or buckled. This condition occurs, for example, during a tank pumping operation and pressure may be built up within the tank when fluid is pumped into the same. The relief valve comprises an annular ring 1 adapted to be secured to the top of the tank by any securing means, for instance rivets, placed through the apertures 2 in the horizontal flange 3 of the ring, around the man hole opening. The ring 1 extends upwardly and is provided with an annular seat 4, against which the gasket ring 5 seats when the relief valve is in closed position. The gasket 5 is disposed in a channeled pressure plate 6, which extends over the ring 1, as clearly shown in Figure 1, and is held in the channel by a securing ring 7 carried by the under side of the plate within the annular ring 1.

When pressure builds up within the tank, the pressure plate 6 is unseated, thereby allowing relief of pressure to the atmosphere, and when a vacuum is formed within the tank, the vacuum valve 8 is sucked downwardly for allowing an in rush of air to the interior of the tank through the central passage 9 through the pressure plate. It will be noted that the pressure plate 6 is provided with a downwardly extending annular flange or body portion 10, which forms the passage 9, and the vacuum relief valve 8 has a seat on the lower end thereof at 11.

Extending upwardly from one side of the flange 3 are spaced ears 12 having a hood pivot bolts 13 extending therethrough, and on the outer ends of which are pivotally mounted the ears 14 carried by the hood 15, which is dome shaped.

The free end of the dome 15 has pivotally connected thereto at 16 a latching member 17. The latching member 17 is provided with a foot engaging arm 18, adapted to be engaged by the foot of the operator for swinging the lower hooked arm 19 out of engagement with the pin 20, which connects the spaced ears 21 carried by the ring 1, therefore it will be seen that the hood is detachably held against upward spring action, by the latch as hereinafter set forth. The arm 22 is adapted to be engaged by the foot of the operator for latching the hood when in closed position. It also acts as weight means for normally swinging the arm 19 inwardly, so it will hook under the pin 20 when forced downwardly. It will be noted that the hood 15 is open on its under side and simply houses the ring 1 in spaced relation thereto, thereby allowing communication with the atmosphere for the exhaust of gases or for the inrush of air for relieving a vacuum within the tank.

Pressure plate 6, at one side thereof, is provided with a lug 23 which will clear the lugs 14 carried by the hood when the plate is partially rotated in relation to the hood during the assembling operation, and after which the U-shaped holding and guide member 24 is secured thereto by means of a screw 25. Member 24 is provided with outwardly extending arms 26 having vertically elongated apertures 27 therein, through which the bolt 13 extends. It will be noted that after the pressure plate is placed in position, and the U-shaped member 24 is secured thereto, the outwardly extending portions 26 will engage the inner faces of the lugs 12 and prevent rotation of the pressure plate, and at the same time, through the medium of the elongated apertures 27, will allow the pressure plate to unseat when the hood is closed, moving in a horizontal plane on a vertical axis.

By providing means whereby the pressure plate will unseat and move upwardly in a horizontal plane, the exhaust area will be uniform entirely around the relief valve.

Extending axially downwardly from the under side of the hood 15 is a cylindrical member 28 having a chamber 29, therein, and interposed between the upper end of the chamber 29 and a filler washer 30, within the upwardly extending cup 31, carried by the spider 32 formed integral with the pressure plate 6 and within the passage 9, is an expansion spring 33 which normally forces the pressure plate downwardly for seating the gasket 5 on the seat 4. The outer periphery of the cup 31, adjacent its upper end, is provided with lugs 34, which engage over the shoulder 35 within the cylindrical member 28 for connecting the pressure plate 6 to the hood. It will be noted that the lugs 34, when the hood is in closed position, are spaced upwardly, for instance as shown in dotted lines at 36, from the shoulder 35, hence the expansion spring 33 will exert a pressure on the pressure plate for maintaining the gasket seated, and for adjusting the seating action incident to wear on the gasket. The shoulder 35, at diametrically opposite sides thereof, is provided with vertical channels 37, through which the lugs 34 are passed during the assembling operation and then the pressure plate 6, without the member 24 thereon, is rotated until the lug 23 is between the lugs 12, and at which time the member 24, carried by the bolt 13 is secured to the lug 23 by the screw 25. It will be noted that during the rotation of the pressure plate 6, a quarter turn is imparted thereto which will bring the limiting lugs 34 out of registry with the channels 37 and above the shoulder 35, hence it will be seen that the pressure plate is interconnected with the hood 15 and the lugs 34 will ride upwardly and downwardly above the shoulder during a pressure relieving operation, and also hold the hood and pressure plate assembled when the hood is raised for a thiefing operation.

The vacuum relief valve 8 is provided with a stem 40, which extends upwardly through an enlarged aperture 41 in the bottom of the cup member 31, and through a smaller aperture in the centering washer 30, and interposed between the centering washer 30 and a pin 42 carried by the upper end of the stem, is a helical spring 43, which normally maintains the vacuum valve 8 seated on the seat 11. This valve, upon the formation of a vacuum within the tank, is unseated and air sucked in from the atmosphere through the hood 15 and air passage 9, around and through the spider 32. By providing a helical spring, a wider range of movement of the vacuum valve takes place. By providing the over sized aperture and the centering washer 30 having a smaller aperture, it is obvious that when the washer 30 is removed the valve seat may be ground with the valve by imparting a movement thereto, other than a concentric one. Where a strictly concentric grinding operation is attempted, the valve seat is scored by the grinding composition. After the grinding operation, the centering member 30 is placed in position so the stem 40 will be guided axially of the relief valve for insuring a positive seating and unseating.

It will be noted that all of the spring action is on the axis of the parts, hence there is a positive uniform seating of the valves, as well as accurate unseating, and the parts will not tip in relation to each other during the operation of the relief valve. Upon opening of the valve this relation is also maintained by the expansion spring 14 coming into contact with the inner periphery of the cup shaped member 31 and the side walls of the elongated apertures 27.

From the above it will be seen that a tank relief valve is provided, whereby pressure built up within the tank is relieved to the atmosphere, and when a vacuum is formed within a tank, the vacuum valve opens and allows an inrush of air for relieving the vacuum and preventing damage to the tank.

The invention having been set forth what is claimed as new and useful is:

1. A pressure relief valve for tanks comprising a man hole ring adapted to be secured to a tank around a man hole, a valve seat formed on the upper side of said ring, a pressure plate cooperating with said seat and having a passage therethrough, a hinged hood hinged to the ring at one side thereof, latching means carried by the free end of the hood and cooperating with detent means carried by the ring for holding the hood in closed position, interengaged chambered members carried by the hood and the pressure plate, a bayonet slot connection between the interengaged members, said interengagement being maintained by a partial rotation of the pressure plate and a hinged connection between the pressure plate and the ring adjacent the hinging point of the hood.

2. A pressure relief valve comprising a tank ring, a valve seat carried by said ring, a pressure relief plate cooperating with said seat and having a passage therethrough, a spring actuated vacuum relief valve carried by the pressure plate and cooperating with the under side thereof around the passage, a hood hinged to the ring and disposed above the pressure plate, a lost motion hinge connection between the pressure plate and the ring whereby it will have parallel movement towards and away from the valve seat, said hinged connection comprising a detachable member carried by the plate, said detachable connecting means cooperating with the ring for holding the plate against rotation after a partial rotation thereof, a bayonet slot connection between the plate and hood, said bayonet slot connection being maintained against disconnection by the detachable member forming the hinging point of the plate and spring means interposed between the hood and plate for normally forcing said parts apart and maintaining the plate seated on the ring seat when the hood is in closed position.

3. A pressure relief valve comprising a ring, a relief valve plate seated on the upper side of the ring, a hood hinged to the ring, latching means carried by the hood and ring for holding the hood in closed position and the relief valve plate seated, a bayonet slot connection between the hood and plate, a detachable member carried by the plate and cooperating with the ring to prevent rotation of the plate and permit outward movement of the plate and maintain the bayonet slot connection between the plate and hood, a spring actuated vacuum valve carried by the plate and an expansion spring interposed between the plate and hood for normally forcing the same apart.

4. A device as set forth in claim 3 wherein the bayonet slot connection between the hood and plate comprises a chambered member carried by the hood, a chambered member carried by the plate and extending into the chambered member of the hood, a shoulder within the chambered member of the hood, said shoulder having slots extending longitudinal therethrough and lugs carried by the chambered member carried by the plate and adapted to be received through the slots and be rotated to a position out of registration therewith above the shoulder.

5. A device as set forth in claim 3 wherein the bayonet slot connection is carried by members extending into each other, said members being carried by the hood and plate, said spring means being disposed within one of said chambered members and extending into the other chambered member.

6. A device as set forth in claim 3 wherein the bayonet slot connection is formed by chambered members extending into each other and carried by the plate and hood axially of the valve, said spring means being disposed within said chambered members on the axis of the relief valve plate.

7. The combination of a pressure and vacuum relief valve comprising a valve seat ring, a pressure plate cooperating with said valve seat ring and hinged to the ring at one side thereof by a lost motion hinge connection whereby it will have axial parallel movement towards and away from the valve seat ring as well as hinged movement, a hood carried by the ring, a bayonet slot connection between the plate and hood, means whereby upon a partial rotation of the plate the bayonet slot connection will be made, means carried by the hinged point of the plate and applied thereto after the partial rotation of the plate for maintaining the hinged connection of the plate to the valve seat ring and the bayonet slot connection between the plate and hood, latching means carried by the hood, an expansion spring interposed between the plate and hood, a vacuum valve carried by the plate and spring means cooperating with the vacuum valve within the first mentioned spring means for maintaining the vacuum valve seated.

8. A device as set forth in claim 7 wherein the bayonet slot connection comprises lugs carried by the plate, slots carried by the hood, said lugs having a limited range of freedom of movement in the slots whereby the expansion spring will maintain the plate seated when the hood is closed.

9. A device as set forth in claim 7 wherein the bayonet slot connection between the hood and plate is maintained by the hinged connection of the plate.

10. A device as set forth in claim 7 including chambered members carried by the hood and plate and extending into each other, said spring means being disposed within the chambered members on the axis of the valve and interposed between the plate and hood, said spring means for the vacuum valve being disposed within one of the chambered members.

11. The combination of a relief valve comprising a base ring having a hinged hood, latching means for attaching the hood to the base ring, a pressure relief plate cooperating with the ring beneath the hood, a bayonet slot connection between the relief plate and the hood, of means for maintaining said bayonet slot connection upon a partial rotation of the pressure plate, said means comprising a detachable member carried by the plate and having a hinged and slidable connection with the ring.

12. A device as set forth in claim 11 wherein the detachable member is formed with outwardly extending arms having vertically elongated apertures and a pivot bolt extending through said apertures and carried by the ring.

13. A device as set forth in claim 11 wherein the hood is provided with spaced ears pivotally connected to spaced ears carried by the ring and the detachable member carried by the pressure relief valve is provided with spaced ears having vertically elongated apertures therein and disposed between the spaced ears of the ring and hood and a pivot pin extending through said ears and apertures and on which the plate is hingedly and slidably mounted.

14. The combination of a pressure and vacuum relief valve having a pressure plate cooperating with a ring for relieving pressure, spring means for normally seating said pressure plate, a hood, chambered members carried by the plate and hood, an expansion spring within said chambered members, a vacuum valve cooperating with the underside of the pressure plate around an opening therein, a stem carried by said vacuum valve and extending upwardly into one of the chambered members, an enlarged aperture in said last named chambered member and through which the stem extends, a filler member within said chambered members and through an aperture of which the vacuum valve stem extends, said filler member centering the vacuum valve and an expansion spring surrounding the stem and interposed between the filler member and the upper end of the stem for seating said filler member.

PHILLIPS BROOKS DRANE.